(12) United States Patent
Okada et al.

(10) Patent No.: US 7,017,446 B1
(45) Date of Patent: Mar. 28, 2006

(54) AXLE DRIVING APPARATUS

(76) Inventors: Hiedeaki Okada, 2-18-1, Inadera Amagasaki-shi, Hyogo 661-0981 (JP); Shusuke Nemoto, 2-18-1, Inadera Amagasaki-shi, Hyogo 661-0981 (JP)

( * ) Notice: Subject to any disclaimer, the term of this patent is extended or adjusted under 35 U.S.C. 154(b) by 16 days.

(21) Appl. No.: 09/717,115

(22) Filed: Nov. 22, 2000

Related U.S. Application Data

(63) Continuation of application No. 09/474,127, filed on Dec. 29, 1999, now Pat. No. 6,938,718, which is a continuation of application No. 08/818,964, filed on Mar. 14, 1997, now abandoned.

(30) Foreign Application Priority Data

| Feb. 3, 1988 | (JP) | ................. P.63-24193 |
| Mar. 9, 1988 | (JP) | ................. P.63-55828 |
| Mar. 18, 1988 | (JP) | ................. P.63-67005 |
| Jun. 16, 1988 | (JP) | ................. 63-79665 |

(51) Int. Cl.
*B60K 7/00* (2006.01)

(52) U.S. Cl. ............... 74/606 R; 180/305; 180/307; 60/487; 60/489

(58) Field of Classification Search ........... 180/305, 180/307; 74/606 R; 60/487, 489
See application file for complete search history.

(56) References Cited

U.S. PATENT DOCUMENTS

| 3,424,032 | A |   | 1/1969 | Ritter |
| 3,903,698 | A | * | 9/1975 | Gellatly et al. ............ 60/453 |
| 4,862,767 | A |   | 9/1989 | Hauser |
| 5,802,931 | A |   | 9/1998 | Louis |
| 5,921,151 | A |   | 7/1999 | Louis et al. |

* cited by examiner

*Primary Examiner*—Kevin Hurley

(74) *Attorney, Agent, or Firm*—Sterne, Kessler, Goldstein & Fox P.L.L.C.

(57) ABSTRACT

An axle driving apparatus wherein a hydraulic motor and a hydraulic pump for a hydro-static-transmission are housed in a transmission casing of the axle driving apparatus and a center section for connecting the hydraulic motor and hydraulic pump is disposed in the transmission casing, the center section being fixed at the butt joint portion at the transmission casing, and an oil passage from the hydraulic pump to the hydraulic motor at the center section is bent at a right angle so as to extend the motor shaft in parallel to the axles, so that the rotation direction of the motor shaft conventionally changed by bevel gears is changed by the oil passages in the center section.

17 Claims, 14 Drawing Sheets

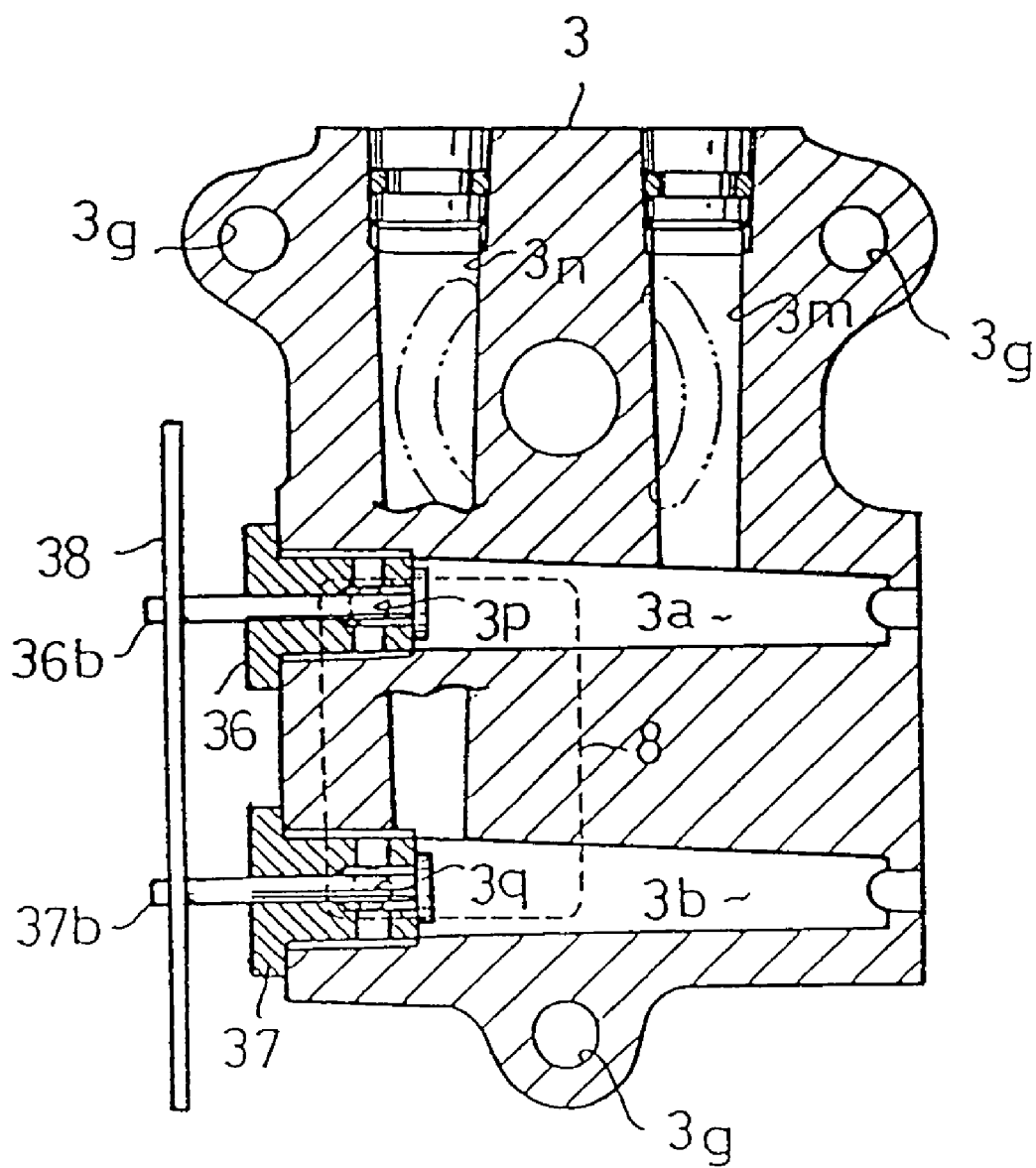
FIG·16

AXLE DRIVING APPARATUS

This application is a continuation of Ser. No. 09/474,127 filed Dec. 29, 1999, now U.S. Pat. No. 6,938,718 which is a continuation of Ser. No. 08/818,964 filed Mar. 14, 1997, now abandoned.

FIELD OF THE INVENTION

The present invention relates to an axle driving apparatus with a hydro-static-transmission used as a driving apparatus for a light tractor.

BACKGROUND OF THE INVENTION

Conventionally, an axle driving apparatus, which vertically divides a casing thereof and journals axles at the divided surfaces and drives the axles by a hydro-static-transmission attached to the casing, is well known as disclosed in, for example, the Japanese Utility Model Publication Gazette No. Sho 62-44198 and the Japanese Patent Laid-Open Gazette Sho 62-101945, filed by the same applicant.

In the conventional prior art, however, the hydro-static-transmission separate from the axle driving apparatus is fixed to the outside thereof in a manner of being exposed, whereby the apparatus is large-sized as a whole and larger in the gross weight. Also, it is required for driving the horizontally disposed axles by a motor shaft of a hydraulic motor vertically disposed at the exterior to interpose bevel gears in a drive system for both the motor shaft and axles.

SUMMARY OF THE INVENTION

An object of the invention is to provide an axle driving apparatus which contains the hydraulic motor and a hydraulic pump at the hydro-static-transmission in a transmission casing of the axle driving apparatus and a center section for connecting the hydraulic motor and hydraulic pump is disposed in the transmission casing, the center section being fixed to the butt joint surface thereof.

The center section is formed in a L-like shape when viewed in section and an oil passage from the hydraulic pump to the hydraulic motor is bent at a right angle to thereby extend the motor shaft in parallel to the axle. Hence, instead of conventional bevel gears used to turn the rotation direction, the oil passage in the center section is used to turn the power transmitting direction.

In a case where the center section is fixed to the butt joint surfaces to the half casings, when the half casings are fixedly jointed directly with aluminum die casting by use of four bolts, the center section may be distorted, thereby using three tightening bolts.

The above and further objects and novel features of the invention will more fully appear from the following detailed description when the same is read in connection with the accompanying drawings.

BRIEF DESCRIPTION OF THE DRAWINGS

FIG. 16 is a sectional plan view of the center section.

DESCRIPTION OF THE PREFERRED EMBODIMENTS

Figure 1:
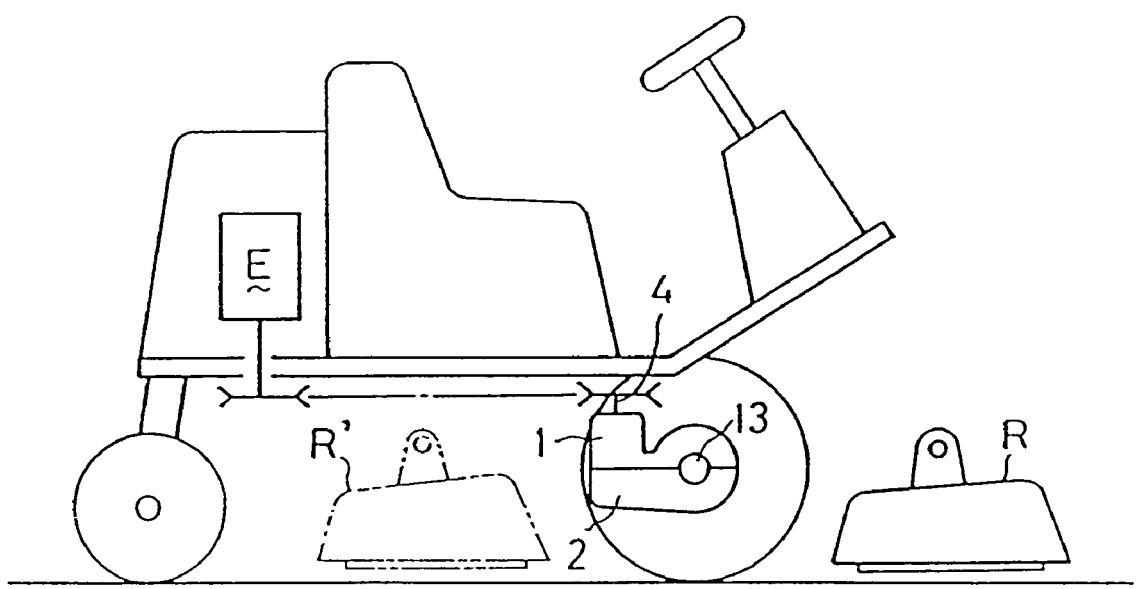
FIG. 1 is a side view of a light tractor attached with an axle driving apparatus of the invention.

Referring to FIG. 1, a light tractor loading thereon an engine E of a vertical crank shaft is shown.

A pulley is fixed to the vertical crank shaft of the engine so that a driving power is transmitted from the pulley through a belt to a pulley fixed to a pump shaft 4 of a hydraulic pump P projecting upwardly from an axle driving apparatus of the invention.

The tractor is provided at the front or under the body with a mower R or R' to thereby mow a lawn.

The present invention relates to the axle driving apparatus for driving axles 13 at the tractor.

Next, the axle driving apparatus will be detailed of its construction in accordance with FIGS. 1 through 6.

A transmission casing of the axle driving apparatus is formed in upper and lower half casings 1 and 2, both the casings being jointed to form one closed-type transmission casing.

Between the butt joint surfaces of the upper and lower half casings 1 and 2 are held bearings to the axles 13 and a counter shaft 24 and a bearing 34 for one end of a motor shaft 5.

At the lower surface of the upper half casing 1 is formed a mounting surface so that a center section 3 fixedly supporting the hydraulic pump P and a hydraulic motor M is mountable to the mounting surface through bolts 39 inserted into bolt holes 3g from below.

In the state where the center section 3 fixing thereto the hydraulic motor M and hydraulic pump P is mounted to the lower surface of the upper half casing 1, the lower half casing 2 is jointed from below with the lower surface of the upper half casing 1 in a manner of closing the lower half casing 2 and bolts are used to connect both the upper and lower half casings 1 and 2.

The upper and lower half casings 1 and 2 are formed by aluminum die casting, whereby parts subjected to mechanical processing are reduced to lower the manufacturing cost.

The HST type transmission stored within the axle driving apparatus comprises the hydraulic pump P, center section 3 and hydraulic motor M, so that a pump mounting surface 3*d* and a motor mounting surface 3*e* are formed in the plane perpendicular to the center section 3.

Pairs of crescent-shaped oil passages 3*a*' and 3*b*' and 3*e*" and 3*b*" are formed at the pump mounting surface 3*d* and motor mounting surface 3*e*, the pair of crescent-shaped oil passages 3*a*" and 3*b*" at the motor mounting surface 3*e* and pair of crescent-shaped oil passages 3*a*' and 3*b*' at the pump mounting surface 3*d* being connected to two oil passages 3*a* and 3*b* to constitute a closed circuit.

A cylinder block 10 for the hydraulic pump P is rotatably mounted on the pump mounting surface 3*d* and pistons 12 are inserted vertically slidably into a plurality of piston holes at the cylinder block 10 respectively.

When the pump shaft 4 supported by a bearing 31 at the upper half casing 1 and a spherical bush 32 at the pump mounting surface 3*d* is rotated, the cylinder block 10 and pistons 12 rotate.

A thrust bearing 15 abutting against the upper end of each piston is changed at an angle by a swash plate 9, so that the discharge rate and discharge direction of the hydraulic pump P are changed to supply the discharged pressure oil from the oil passages 3*a*' and 3*b*' at the center section 3 to the hydraulic motor M through the oil passages 3*a* and 3*b*.

Figure 4:
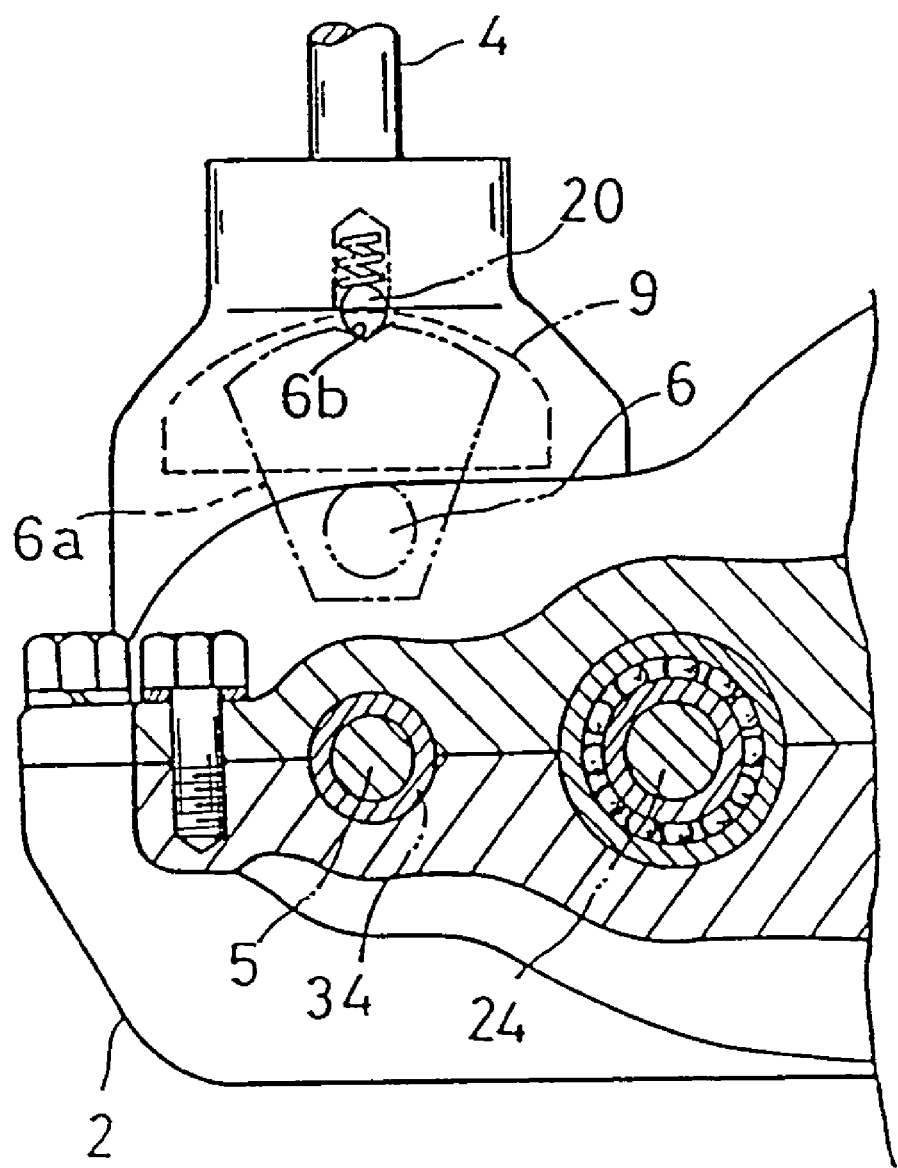
FIG. 4 is a sectional view taken on the line V—V in FIG. 3.
Figure 5:
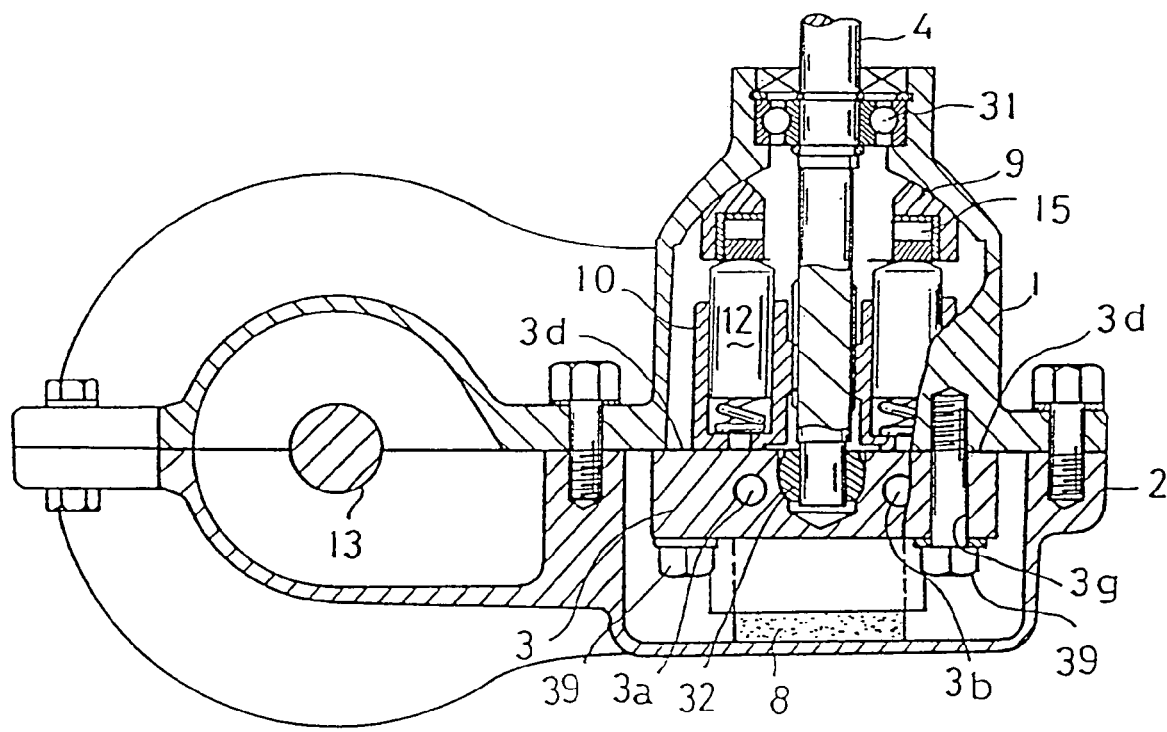
FIG. 5 is a sectional view taken on the line VI—VI in FIG. 3.

As shown in FIG. 4, the swash plate 9 is changeable of its angle through a positioning plate 6*a* in association with rotation of a speed change lever shaft 6, a detent unit 20 for holding the neutral position of the speed change lever shaft 6 being constituted in the upper half casing 1.

The detent unit 20 is fitted into a recess 6*b* at the positioning plate 6*e*, thereby enabling the neutral position to be ensured.

Figure 2:
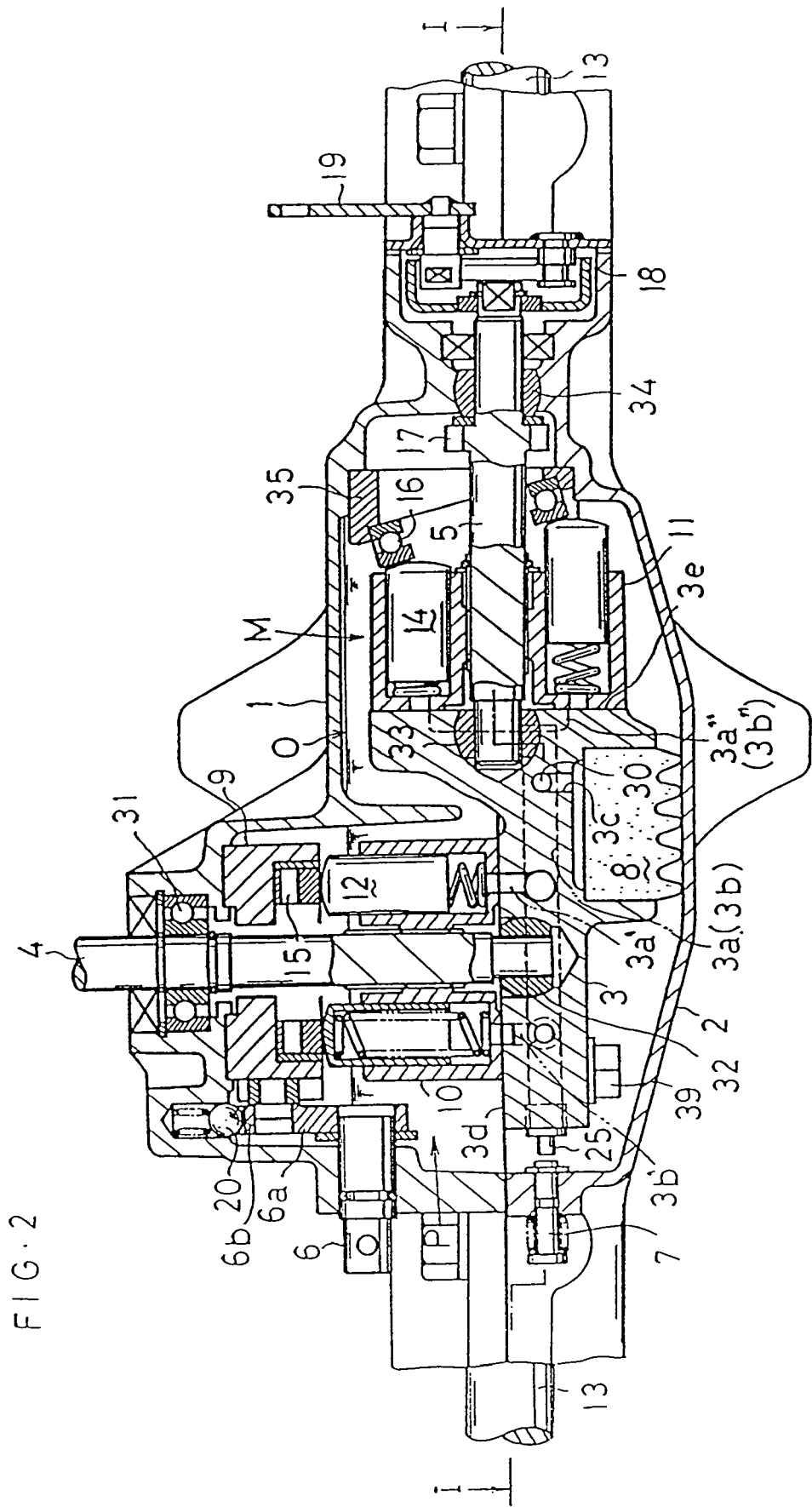
FIG. 2 is a sectional front view thereof.
Figure 3:
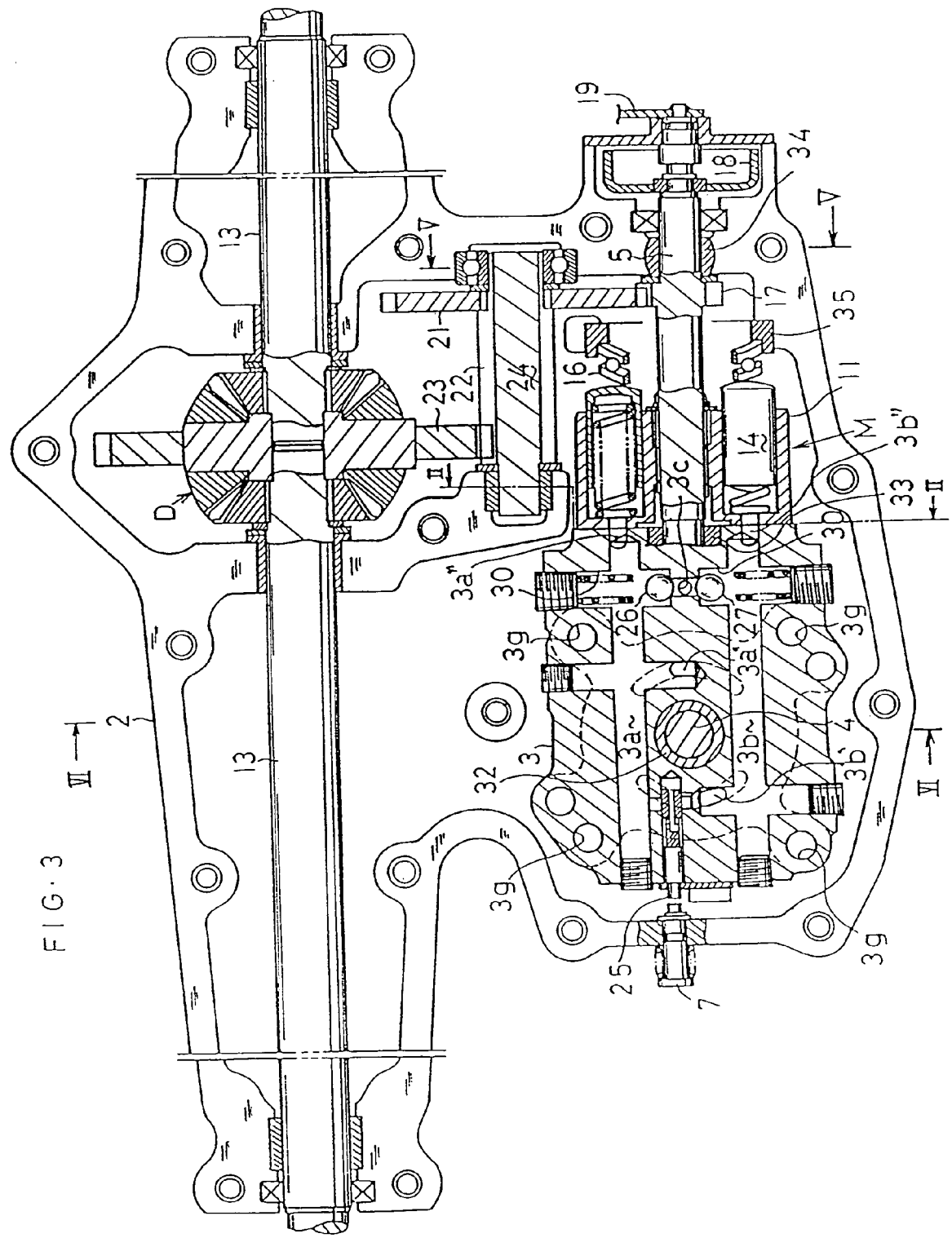
FIG. 3 is a sectional view taken on the line I—I in FIG. 2, in which an upper half casing is removed.

As shown in FIGS. 2 and 3, a short-circuit valve 25 of slidable selector valve for short-circuiting between the two oil passages 3*a* and 3*b* at the discharge side and the return side is disposed, so that when the valve 25 is changed over to haul the body of tractor, generation of the state where the hydraulic motor M side is driven to send the pressure oil toward the hydraulic pump side can be avoided.

Reference numeral 7 designates a control for operating the short-circuit valve 25.

The short-circuit valve 25 and control 7 are slidably operated to push to be disengageable or pull without engagement in order to be controllable in the abutting condition. Such construction enables simple assembly of the apparatus.

Between the oil passages 3*a* and 3*b* at the center section 3 are interposed check valves 26 and 27 to form an oil feed route 30, and between the check valves 26 and 27 is bored an operating oil suction port 3*c* extending downwardly.

In the lower end of operating oil suction port 3*c* is fitted an oil filter 8 formed of a spongy fine-porous material, the oil filter 8 contacting with the lower half casing 2 so as to be held thereto.

Thus, the oil filter 8, operating oil suction port 3*c* and check valves 26 and 27 are provided to communicate with the oil passages 3*a* and 3*b* through the check valves 26 and 27, whereby in a case where the hydraulic motor M and hydraulic pump P operate and the operating oil leaks from the interior of the closed circuit so as to decrease, the oil passage 3*a* or 3*b* generates therein negative pressure so that lubricating oil in the casing is taken in as the operating oil.

In addition, reference numeral 0 designates an oil level of lubricating oil filled into the transmission casing.

The pump mounting surface 3*d* at the center section 3 is somewhat larger in its flat surface to also serve as the surface through which the center section 3 is mounted to the lower surface of the upper half casing 1.

A cylinder block 11 is rotatably mounted onto the motor mounting surface 3*e* at the center section 3, and pistons 14 are slidably fitted into a plurality of piston holes at the cylinder block 11 and always abut at the heads against a thrust bearing 16. In such construction, the pistons 14 push the thrust bearing 16 through the pressure oil from the oil passages 3*a* and 3*b* and slide down at the heads along the slanted surface of the thrust bearing so as to generate a torque, thereby rotating the cylinder block 11 and motor shaft 5.

The thrust bearing 16 is supported by an annular supports 35 in relation of being slanted at a predetermined angle, the annular support 35 being fixedly sandwiched between the upper and lower half casings 1 and 2.

The motor shaft 5 is provided at one axial end journalled to the center section 3 with a spherical bush 33 and at the other end with a spherical bush 34, which are sandwiched between the upper and lower half casings 1 and 2.

A gear 17 is mounted on the motor shaft 5 and engages with a gear 21 on the counter shaft 24, the gears 17 and 21 constituting the first deceleration means.

A small diameter gear 22 on the counter shaft 24 engages with a ring gear 23 at a differential gear unit D, which gives differential rotations to drive the axles 13.

The small diameter gear 22 and ring gear 23 constitute the second deceleration means.

A brake drum 18 is fixed to the foremost end of the motor shaft 5 and brake shoes are expanded radially outwardly by a brake lever 19 to contact with the brake drum 18, thereby exerting the braking action.

Figure 6:
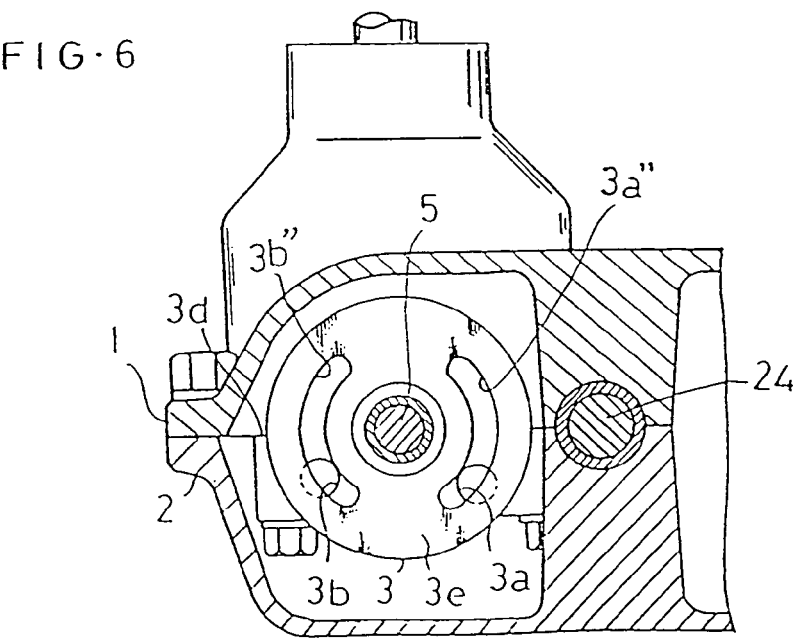
FIG. 6 is a sectional view taken on the line II—II in FIG. 3.
Figure 7:
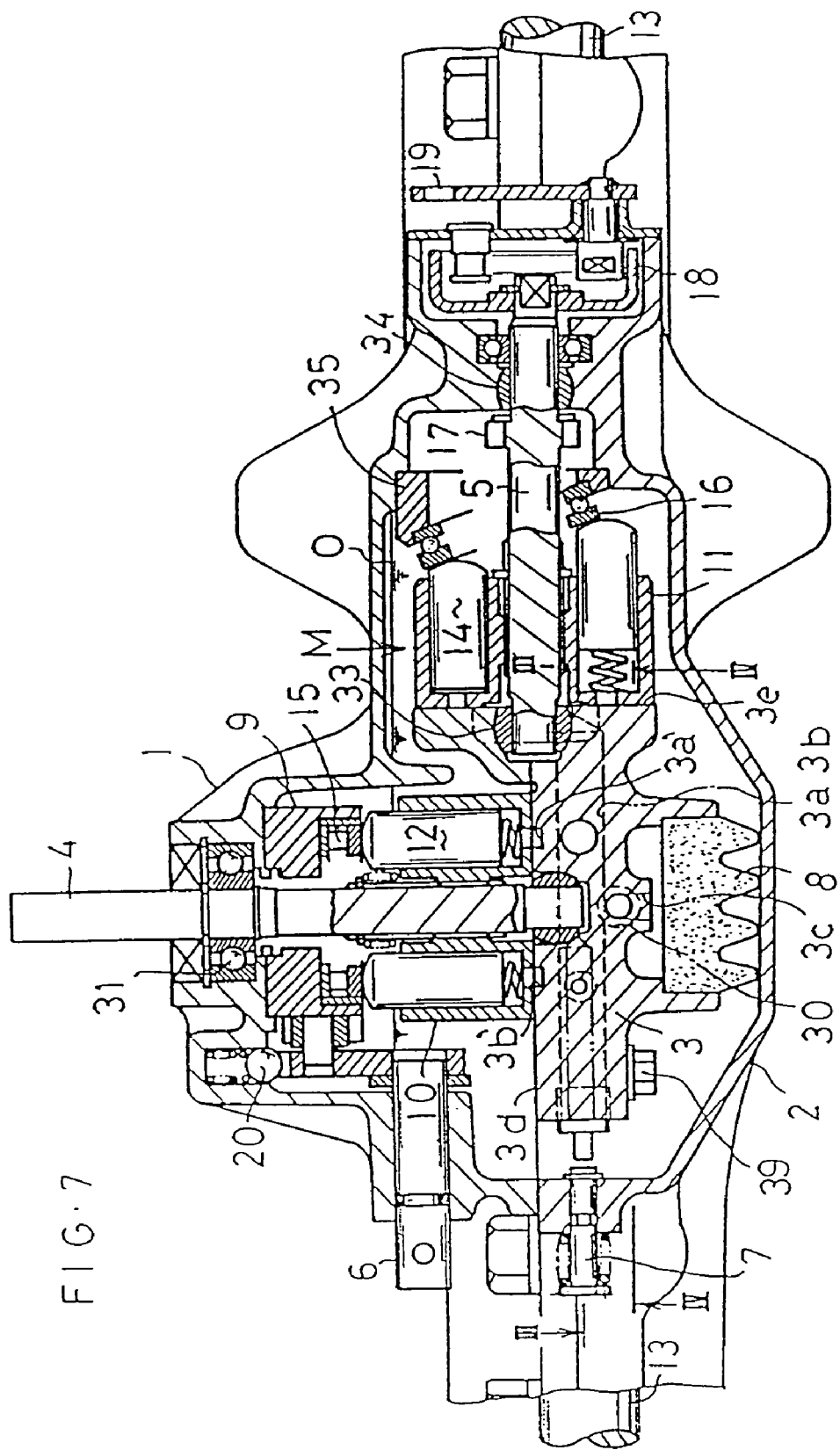
FIG. 7 is a sectional front view of a modified embodiment of the axle driving apparatus of the invention, in which check valves are changed in arrangement thereof.
Figure 8:
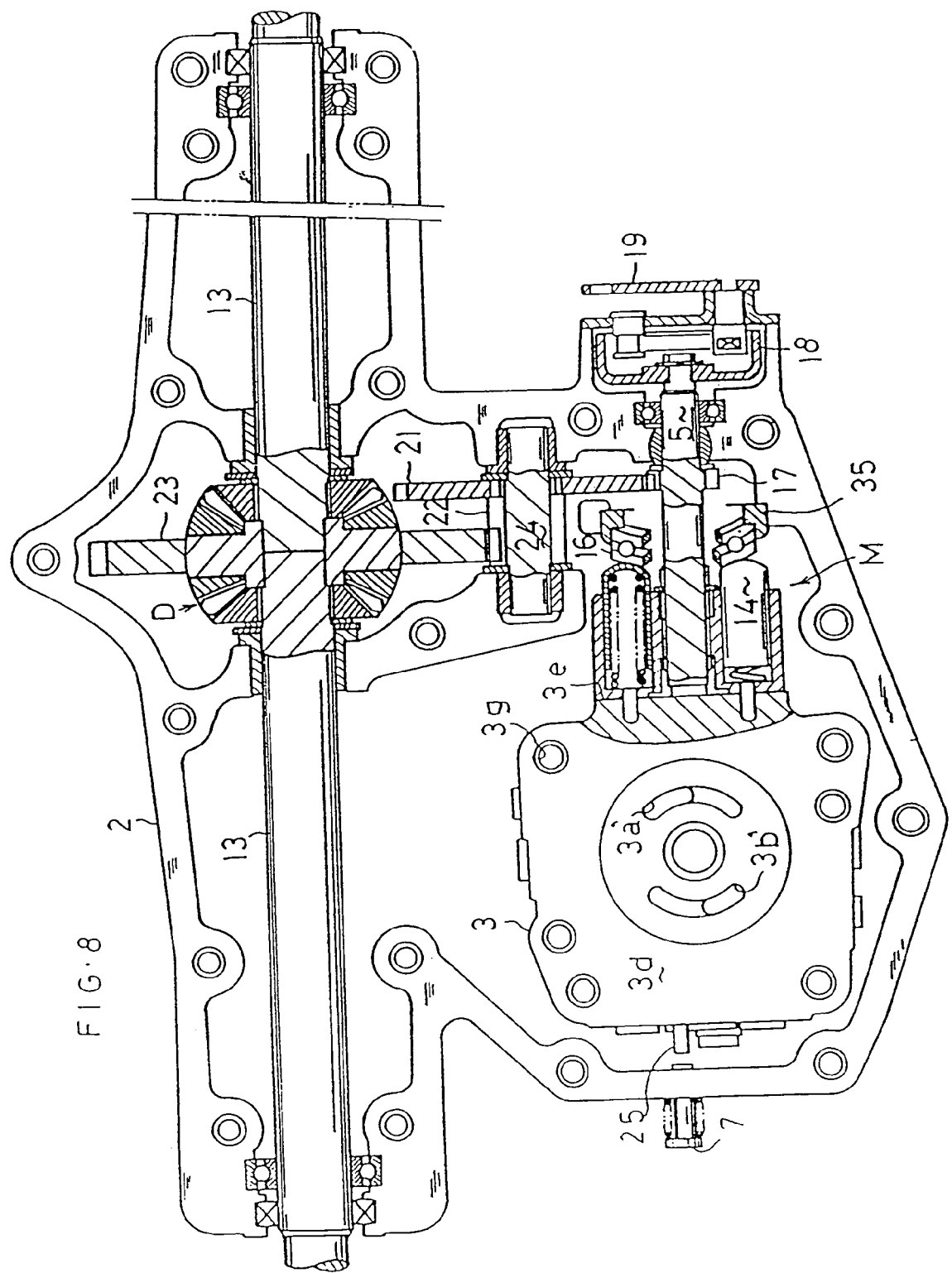
FIG. 8 is a plan view of the same.
Figure 9:
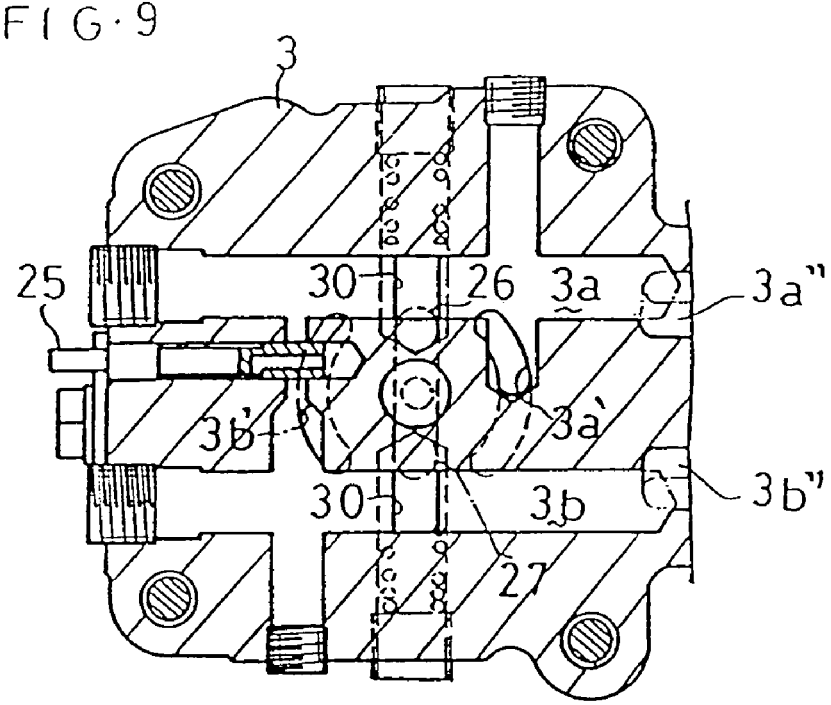
FIG. 9 is a sectional view taken on the line III—III in FIG. 7.
Figure 10:
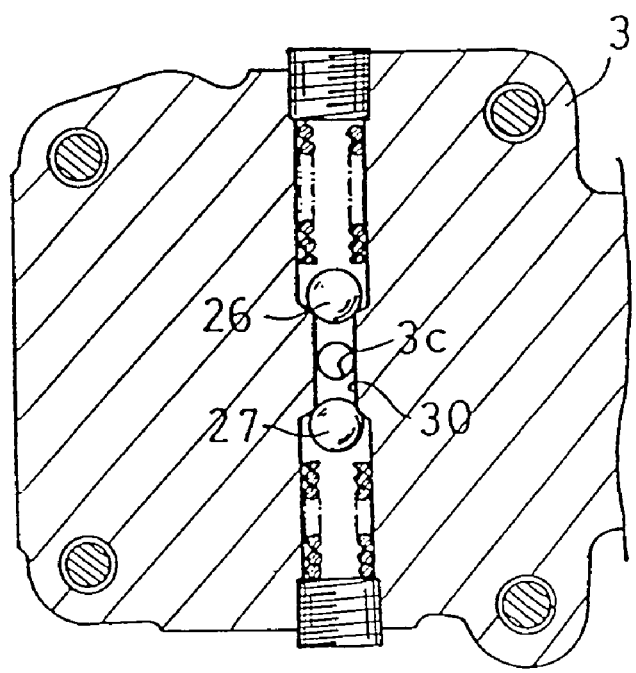
FIG. 10 is a sectional view taken on the line IV—IV in FIG. 7.
Figure 11:
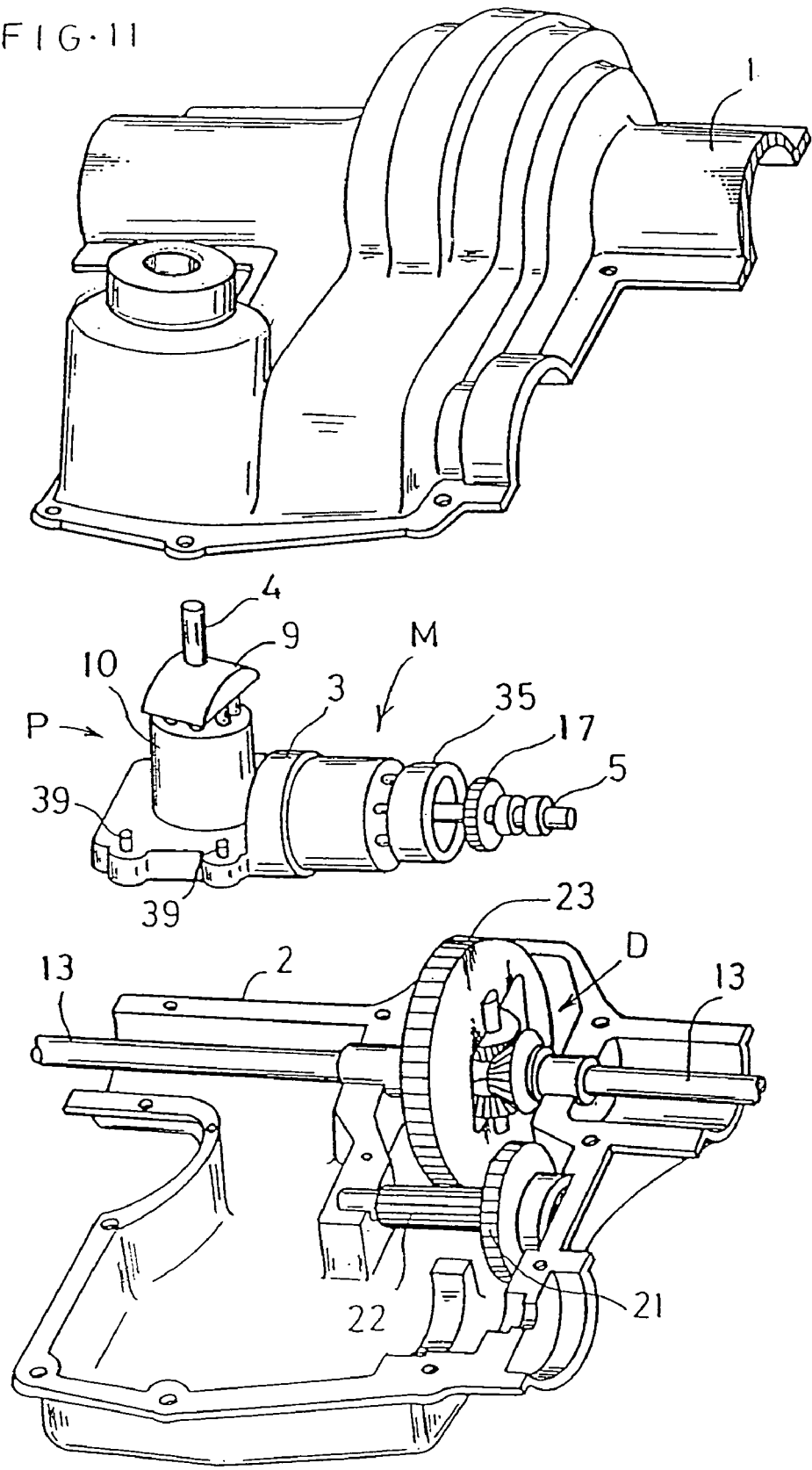
FIG. 11 is a perspective exploded view of the axle driving apparatus of the invention.

In FIG. 6, part of motor mounting surface 3*e*, against which the motor casing 11 for the hydraulic motor M, abuts, is shown.

Referring to FIGS. 7, 8, 9 and 10, a modified embodiment of the axle driving apparatus of the invention will be described.

In the embodiment shown in FIGS. 2 and 3, the oil passages 3*a* and 3*b* and supply oil passage 30 are provided at the same plane, but in this case, the motor mounting surface 3*e* must separate with respect to the pump mounting surface 3*d*, whereby the center section 3 cannot be compact to that extent and also the casing becomes larger.

Therefore, in the embodiment shown in FIGS. 7 through 10, in order to eliminate the above defects, the supply oil passage 30 is disposed to overlap with the oil passages 3*a* and 3*b* in a range of thickness of the lower portion of the center section 3 and below the oil passages 3*a* and 3*b*.

The supply oil passage 30 is bored to communicate at the upper half thereof with the lower halves in a manner of overlapping therewith. Hence, the oil passage connecting both the oil passages 30 and 3*a*, 3*b* is not required, thereby enabling the center section 3 to be made as smaller as possible in thickness.

At the center of the supply oil passage 30 is open an operating oil suction port 3*c* toward an oil filter 8 positioned below, and check valves 26 and 27 for opening or closing the communicating portion between the oil passages 3*a* and 3*b* are interposed in the supply oil passage 30 in relation of putting the operating oil suction port 3*c* between the check valves 26 and 27. Supply oil from the operating oil suction port 3*c* flows to the oil passages 3*a* and 3*b* through the portion at the supply oil passage 30 where the supply oil passes the check valves 26 and 27.

Thus, within the center section 3, the oil passages 3*a* and 3*b*, supply oil passage 30 and oil filter 8 overlap with each other, whereby the motor mounting surface 3e can approach the pump mounting surface 3d so as to enable the center section 3 to be compact.

Next, explanation will be given on the embodiment in FIGS. 12 and 13.

In this embodiment, a center section 3 abuts from above against the inner surface of the bottom wall of the lower half casing 2 and is fixed thereto.

Bolts 39 for fixing the center section 3 also are inserted from above into the bolt bores and screw with the lower half casing 2 respectively.

Figure 12:
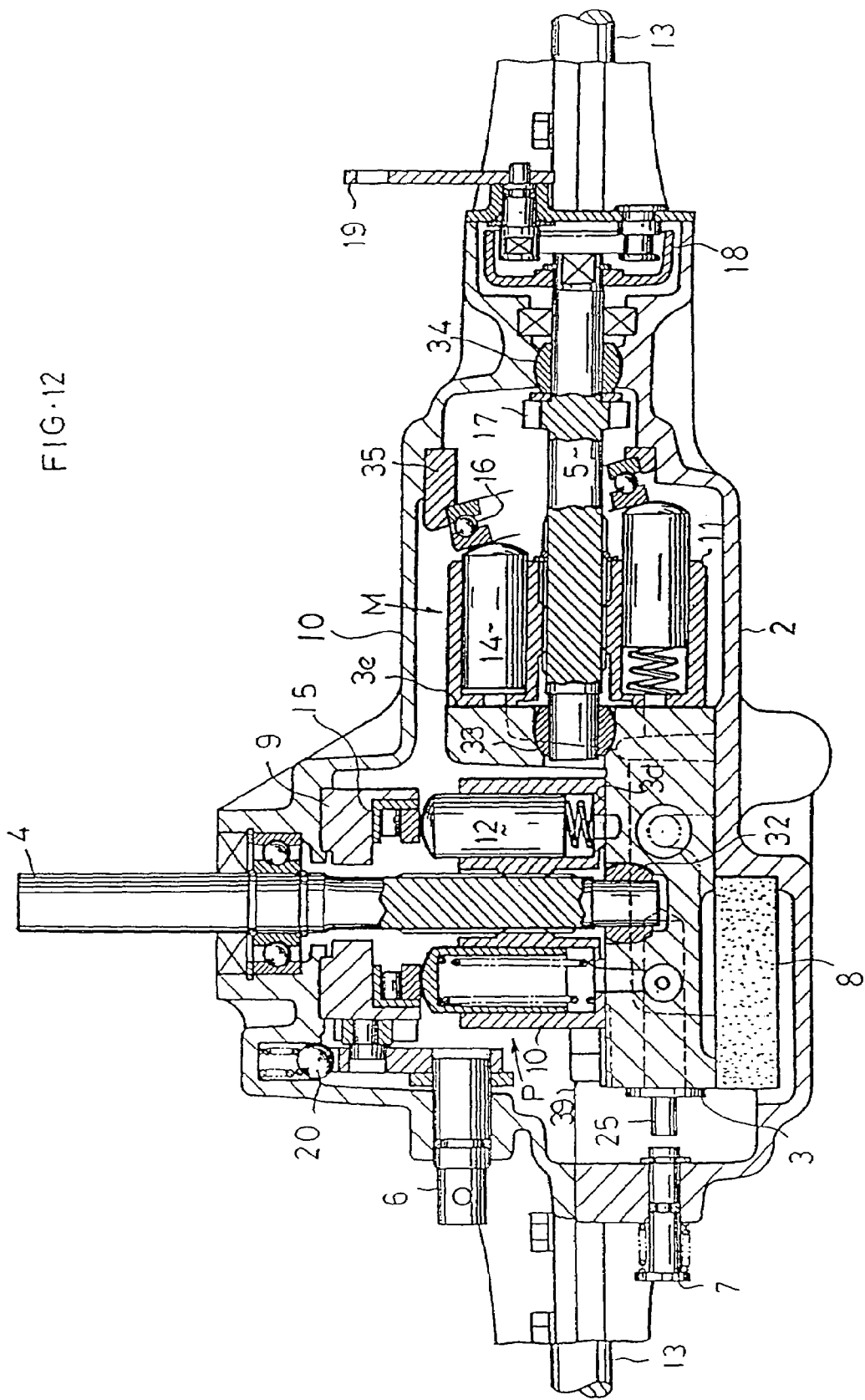
FIG. 12 is a sectional front view of another modified embodiment of the invention, in which a center section is fixed to the inner surface of the bottom wall of a lower half casing.
Figure 13:
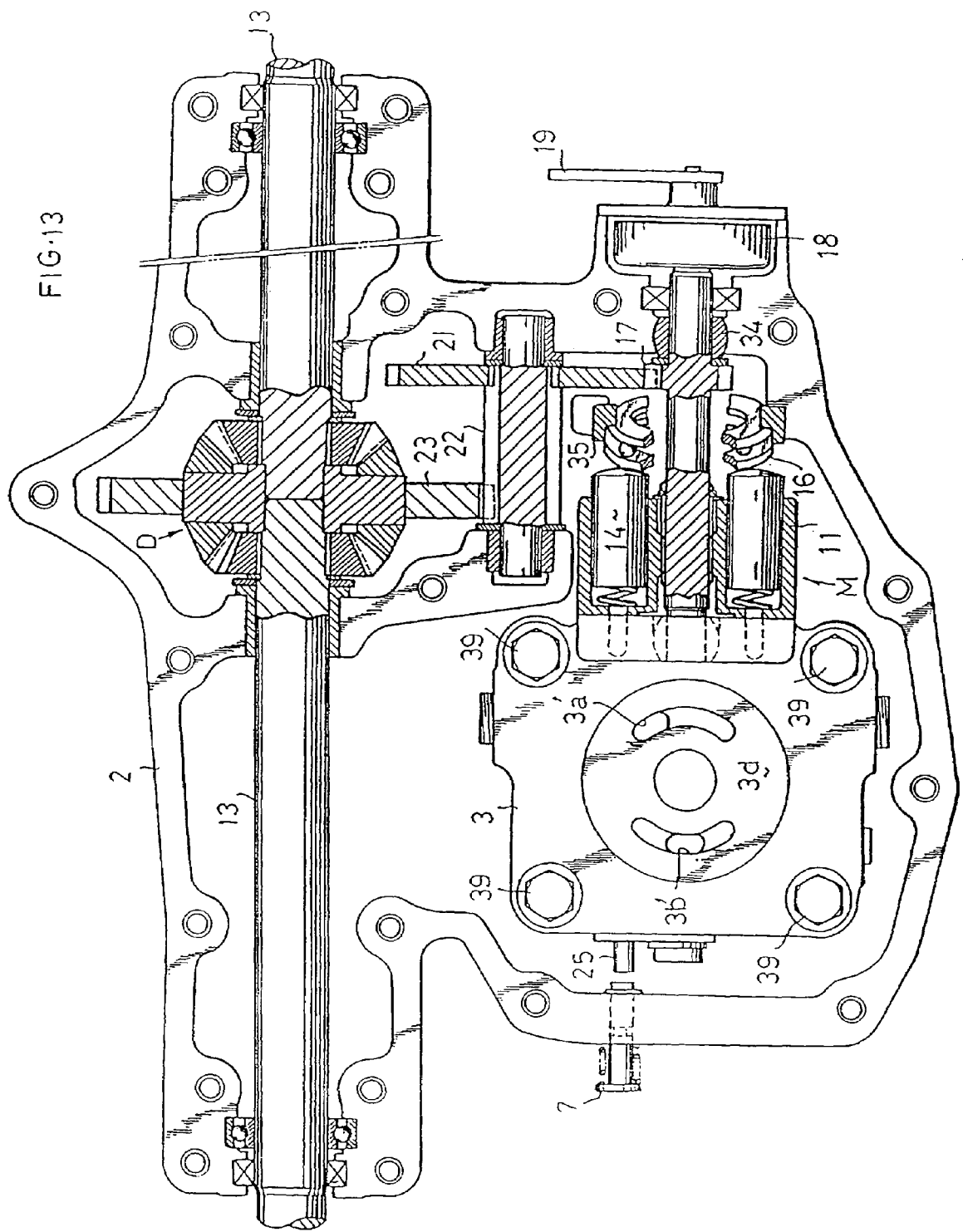
FIG. 13 is a plan view of the FIG. 12 embodiment.

The center section 3 in this embodiment, as shown in FIG. 12, is about L-like-shaped when viewed in section from the rear surface.

Other constructions are about the same as the aforesaid embodiment.

Next, explanation will be given on the embodiment in FIGS. 14, 15 and 16.

In this embodiment, three bolt bores 3g for three bolts 39 for fixing the center section 3 to the lower surface of the upper half casing 1 are provided at the center section 3, the three bolts 39 fixing the center section 3 to the upper half casing 1.

The center section 3 and upper half casing 1 constitute material with aluminum die casting, the mounting surfaces of both the members being not applied with machining.

Hence, when four bolts 39 are used to fix the center section 3, an error in material may distort the same to worsen the tight condition.

In such case, three bolts 39 are inserted into three bolt bores 3g to fix the center section 3, thereby keeping all the bolts in good tight conditions.

Figure 14:
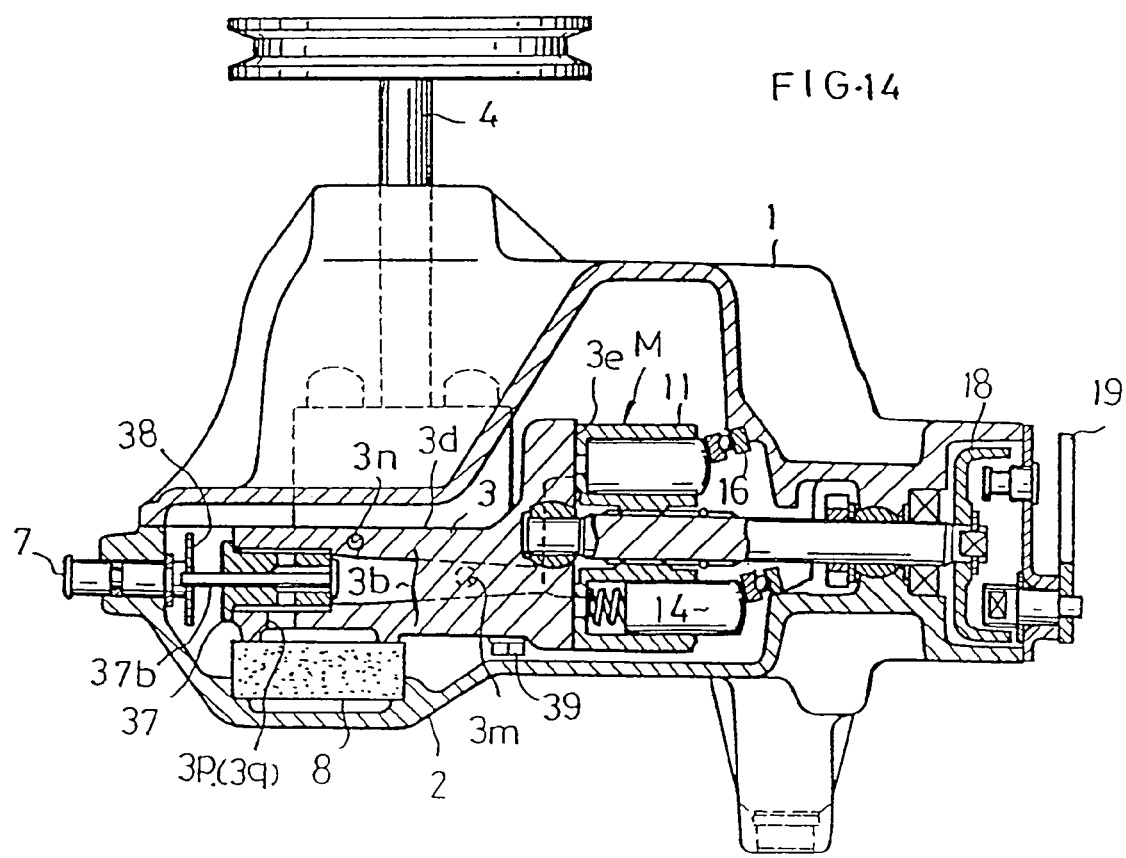
FIG. 14 is a sectional front view of a further modified embodiment of the invention, in which a center section has three bolt-bores into which three fixing bolts are inserted so that the center section is fixed therethrough to the upper half casing.
Figure 15:
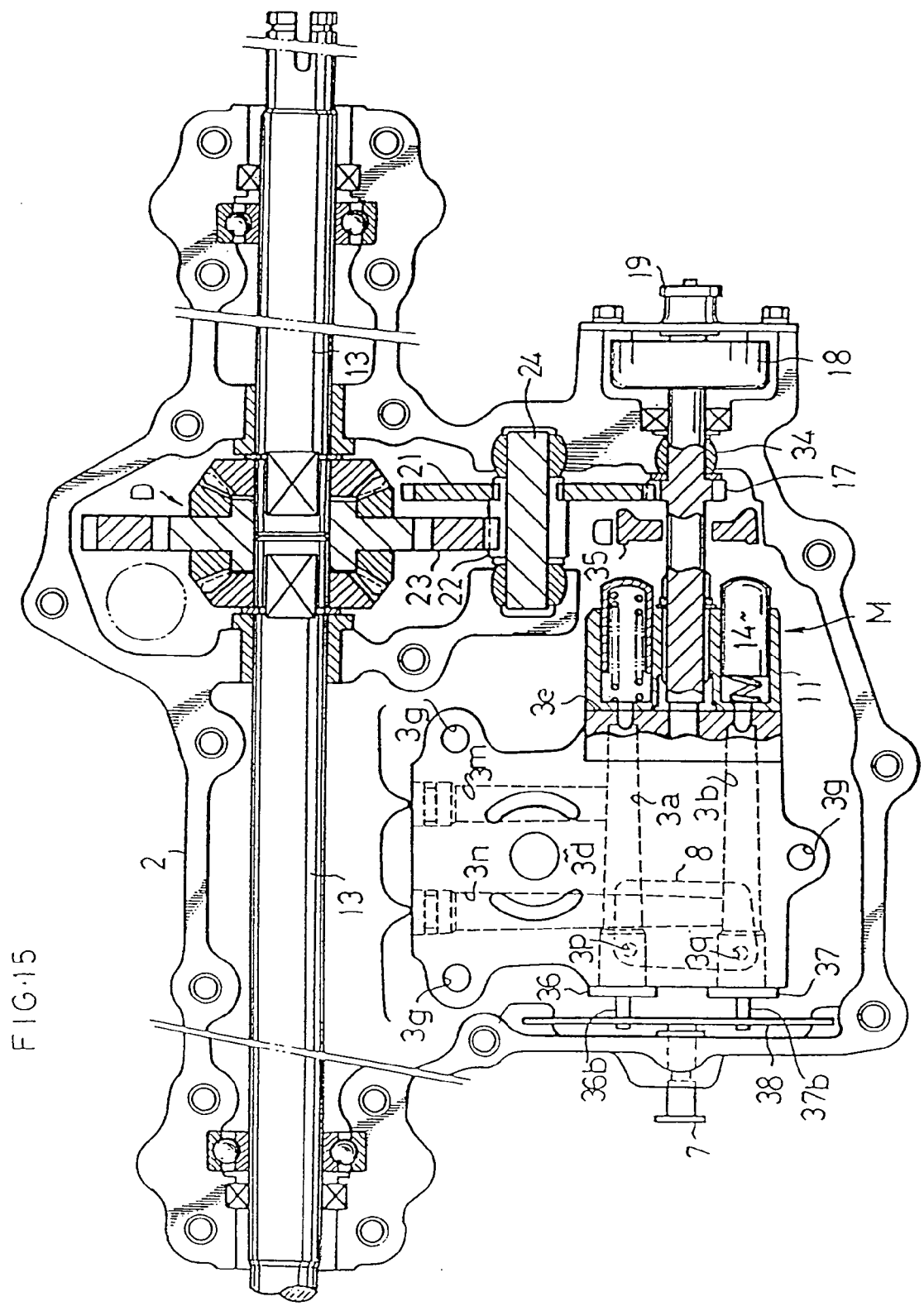
FIG. 15 is a plan view of the FIG. 14 embodiment.

In the embodiment in FIGS. 14, 15 and 16, the pump mounting surface 3d is not adjacent to the motor mounting surface 3e at the center section 3, but near the axle 13.

Oil passages 3a and 3b are bored from a pair of crescent-shaped oil passages provided at the motor mounting surface 3e and extend in parallel to the axles 13, oil passages 3m and 3n being bored from a pair of crescent-shaped oil passages and extending perpendicularly to the axles 13, so that both oil passages 3m and 3a and 3n and 3b communicating with each other in the center section 3.

The open ends of oil passages 3m and 3n are plugged and the plugs are locked by projections formed at the bottom of the lower half casing 2 respectively.

Check valves 36 and 37 are provided at open ends of oil passages 3a and 3b, valve levers 36b and 37b of which are connected to a leaf spring 38.

The valve levers 36b and 37b are open only in the direction of flowing oil from the operating oil suction ports 3p and 3q into the oil passages 3a and 3b, so that the check valves 36 and 37 flowing into the oil passages 3a and 3b the supply operating oil after passing the plate-like oil filter 8 discharges to the exterior the pressure oil in the oil passages 3a and 3b by pushing the valve levers 36b and 37b through the leaf spring 38 pushed by a control 7, thereby serving as the short circuit valves to cause the free condition of hydraulic motor M.

As seen from the above, the center section 3 carrying the hydraulic pump P vertically and the hydraulic motor M horizontally is provided and contained within the transmission casing while carrying both the pump P and motor M, whereby the operating oil, even when leaked from the hydraulic pump P or hydraulic motor M, does not flow out to the exterior. Also, since the oil passages are formed at the center section 3, the piping is not at all required in or out the transmission casing.

The center section 3 is fixed to the upper half casing 1 or the lower half casing 2, thereby being simple to support. Also, the pump shaft 4 and motor shaft 5 are simple to support.

The pump mounting surface 3d and motor mounting surface 3e are disposed in an L-like-shape and the center suction 3 is about L-like-shaped when viewed in section, so that the pump shaft 4 of input shaft is vertical and the motor shaft 5 of output shaft is horizontal, thereby making the axle driving apparatus compact without interposing the bevel gears, and the power transmitting direction can be changed at an angle of 90°, thereby having advantages for the tractor loading a vertical shaft-output shaft type engine.

The center section 3 is fixed to the lower side of the butt joint surface of the upper half casing 1 so that the pump mounting surface 3d is level with the mounting surface of the center section 3 to the upper half casing, whereby the surfaces of the upper half casing 1, lower half casing 2 and center section 3 can be restricted to a minimum.

Three bores 3g for the three fixing bolts 39 through which the center section 3 is fixed to the lower surface of the upper half casing 1 are formed, so that when the mounting surfaces of center section 3 and of upper half casing 1 are fixed as they are not flattened but cast, there is no fear that a poor tightening, condition is created on the center section 3.

The spherical bush 32 at the pump shaft 4 and spherical bush at the bearing for the motor shaft are used, so that even when the center section 3 is mounted slantwise due to an assembly error or a machining error, a shift or the pump shaft 4 or the motor shaft 5 is absorbable.

Also, the spherical bush is smaller in the size than the usual bearing, whereby the bearing is disposable without interfering with the oil passages bored at the center section.

Although several embodiments have been described, they are merely exemplary of the invention and not to be constructed as limiting, the invention being defined solely by the appended claims.

What is claimed is:

1. An axle driving apparatus, comprising:
   a casing including an upper half casing part and a lower half casing part joined with each other through a joint surface;
   a hydraulic pump disposed in said casing and including a pump shaft also serving as an input shaft and a pump piston disposed parallel to said pump shaft, wherein said pump shaft is disposed perpendicular to said joint surface of said casing;
   a hydraulic motor disposed in said casing and including a motor shaft and a motor piston disposed parallel to said motor shaft, wherein said motor shaft is disposed parallel to said joint surface of said casing and drivingly connected to axles via a differential gear;
   a center section disposed in said casing and fluidly connecting said hydraulic pump and said hydraulic motor with each other, wherein said hydraulic pump and said hydraulic motor are mounted on said center section so that said pump shaft and said motor shaft are disposed perpendicular to each other, wherein said center section is fixed to said upper half casing part, and wherein said center section is provided therein with a closed circuit for hydraulic connection of said hydraulic pump and said hydraulic motor and with an oil suction port;
   a check valve disposed in said center section, wherein said check valve is interposed between said oil suction port and said closed circuit.

2. The axle driving apparatus as set forth in claim 1, further comprising:
a filter sandwiched between said center section and said lower half casing part, wherein said oil suction port is open into said filter.

3. The axle driving apparatus as set forth in claim 1, further comprising:
a movable swash plate of said hydraulic pump disposed in said casing; and
a bearing supported by said movable swash plate, said bearing abutting against said pump piston.

4. The axle driving apparatus as set forth in claim 3, further comprising:
a speed control lever shaft interlocking with said movable swash plate, said speed control lever shaft being rotatably supported by said upper half casing part.

5. An axle driving apparatus comprising:
a casing including an upper half casing part and a lower half casing part joined with each other;
a hydraulic pump disposed in said casing, said hydraulic pump including a pump shaft and a pump piston disposed parallel to said pump shaft;
a hydraulic motor disposed in said casing, said hydraulic motor including a motor shaft and a motor piston disposed parallel to said motor shaft;
a center section disposed in said casing for fluidly connecting said hydraulic pump and said hydraulic motor with each other, wherein said hydraulic pump and said hydraulic motor are mounted on said center section so that said pump shaft and said motor shaft are disposed perpendicularly to each other, and wherein said center section is fixed to said upper half casing part; and
a check valve disposed in said center section, wherein said center section is provided therein with a closed circuit for hydraulic connection of said hydraulic pump and said hydraulic motor and with an oil suction port, and wherein said check valve is interposed between said closed circuit and said oil suction port.

6. The axle driving apparatus as set forth in claim 5, further comprising:
a filter sandwiched between said center section and said lower half casing part, said oil suction port is open into said filter.

7. The axle driving apparatus as set forth in claim 5, further comprising:
a movable swash plate of said hydraulic pump disposed in said casing; and
a bearing supported by said movable swash plate, said bearing abutting against said pump piston.

8. The axle driving apparatus as set forth in claim 7, further comprising:
a speed control lever shaft interlocking with said movable swash plate, said speed control lever shaft being rotatably supported by said upper half casing part.

9. The axle driving apparatus as set forth in claim 5, further comprising:
a differential gear engaging said motor shaft in said casing; and
a pair of axles as output means horizontally disposed in said casing and differentially connected with each other through said differential gear.

10. The axle driving apparatus as set forth in claim 5, wherein said motor shaft is horizontally and rotatably supported between said upper half casing part and said lower half casing part.

11. An axle driving apparatus, comprising:
a hydraulic pump including a pump shaft also serving as an input shaft, a pump piston disposed parallel to said pump shaft, and a movable swash plate abutting against said pump piston, said movable swash plate being provided with a detent mechanism;
a hydraulic motor including a motor shaft and a motor piston disposed parallel to said motor shaft;
a center section for fluidly connecting said hydraulic pump and said hydraulic motor with each other, wherein said hydraulic pump and said hydraulic motor are mounted on said center section so that said pump shaft and said motor shaft are disposed perpendicular to each other;
a differential gear engaging said motor shaft; and
a pair of axles as output means differentially connected with each other through said differential gear, wherein said pair of axles are disposed perpendicularly to said pump shaft.

12. The axle driving apparatus as set forth in claim 11, further comprising:
a casing including an upper half casing part and a lower half casing part joined with each other, wherein said hydraulic pump, said hydraulic motor, said center section, said differential gear and said pair of axles are disposed in said casing.

13. The axle driving apparatus as set forth in claim 12, wherein said center section is fixed to said upper half casing part.

14. An axle driving apparatus, comprising:
a casing including an upper half casing part and a lower half casing part joined with each other;
a hydraulic pump disposed in said casing, said hydraulic pump including a pump shaft also serving as an input shaft, a pump piston disposed parallel to said pump shaft, and a movable swash plate abutting against said pump piston, said movable swash plate being provided with a detent mechanism;
a hydraulic motor disposed in said casing, said hydraulic motor including a motor shaft and a motor piston disposed parallel to said motor shaft; and
a center section disposed in said casing for fluidly connecting said hydraulic pump and said hydraulic motor with each other, wherein said hydraulic pump and said hydraulic motor are mounted on said center section so that said pump shaft and said motor shaft are disposed perpendicularly to each other.

15. The axle driving apparatus as set forth in claim 14, wherein said center section is fixed to said upper half casing part.

16. An axle driving apparatus, comprising:
a hydraulic pump including a pump shaft also serving as an input shaft and a pump piston disposed parallel to said pump shaft;
a hydraulic motor including a motor shaft and a motor piston disposed parallel to said motor shaft;
a center section for fluidly connecting said hydraulic pump and said hydraulic motor with each other, wherein said hydraulic pump and said hydraulic motor are mounted on said center section so that said pump shaft and said motor shaft are disposed perpendicular to each other;
a differential gear engaging said motor shaft; and
a pair of axles as output means differentially connected with each other through said differential gear, wherein said pair of axles are disposed perpendicularly to said pump shaft and parallel to said motor shaft, and wherein said pump shaft is disposed between said motor shaft and said pair of axles.

17. The axle driving apparatus as set forth in claim 16, further comprising: a casing including an upper half casing part and a lower half casing part joined with each other, wherein said hydraulic pump, said hydraulic motor, said center section, said differential gear and said pair of axles are disposed in said casing.

* * * * *

UNITED STATES PATENT AND TRADEMARK OFFICE
CERTIFICATE OF CORRECTION

| | |
|---|---|
| PATENT NO. | : 7,017,446 B1 |
| APPLICATION NO. | : 09/717115 |
| DATED | : March 28, 2006 |
| INVENTOR(S) | : Okada et al. |

Page 1 of 1

It is certified that error appears in the above-identified patent and that said Letters Patent is hereby corrected as shown below:

In section (76) on Title page, first named inventor, "Hiedeaki Okada", should read --Hideaki Okada--.

Signed and Sealed this

Twenty-second Day of August, 2006

JON W. DUDAS
*Director of the United States Patent and Trademark Office*